United States Patent
Gargi (10) Patent No.: US 7,107,520 B2
(45) Date of Patent: Sep. 12, 2006

(54) AUTOMATED PROPAGATION OF DOCUMENT METADATA

(75) Inventor: Ullas Gargi, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 10/298,919

(22) Filed: Nov. 18, 2002

(65) Prior Publication Data

US 2004/0098362 A1 May 20, 2004

(51) Int. Cl.
*G06F 15/00* (2006.01)
*G06F 17/00* (2006.01)

(52) U.S. Cl. ............ 715/512; 715/500.1; 715/514; 715/530; 715/538

(58) Field of Classification Search .......... 715/512, 715/514, 529–530, 538; 707/102, 104.1
See application file for complete search history.

(56) References Cited

U.S. PATENT DOCUMENTS

| | | | | |
|---|---|---|---|---|
| 5,493,677 A | * | 2/1996 | Balogh et al. | 707/104.1 |
| 5,822,539 A | * | 10/1998 | van Hoff | 709/236 |
| 5,832,474 A | * | 11/1998 | Lopresti et al. | 707/2 |
| 6,154,754 A | | 11/2000 | Hsu et al. | |
| 6,332,144 B1 | * | 12/2001 | deVries et al. | 715/512 |
| 6,484,156 B1 | * | 11/2002 | Gupta et al. | 707/1 |
| 6,519,603 B1 | * | 2/2003 | Bays et al. | 707/102 |
| 2002/0111966 A1 | * | 8/2002 | Fukuda et al. | 707/513 |
| 2004/0003352 A1 | * | 1/2004 | Bargeron et al. | 715/530 |
| 2004/0019608 A1 | * | 1/2004 | Obrador | 707/104.1 |
| 2004/0078757 A1 | * | 4/2004 | Golovchinsky et al. | 715/512 |
| 2004/0205482 A1 | * | 10/2004 | Basu et al. | 715/512 |
| 2005/0022114 A1 | * | 1/2005 | Shanahan et al. | 715/513 |

OTHER PUBLICATIONS

Barnard, Kobus, et al., "Matching Words and Pictures," http://www.cs.berkeley.edu/kobus/research/publications/JMLR/JMLR.pdf.

* cited by examiner

*Primary Examiner*—William Bashore
*Assistant Examiner*—Chau Nguyen (57) ABSTRACT

An automated method for conditionally propagating metadata instances among documents includes defining groups of metadata instances and includes assigning different propagation coefficients to each group. Each propagation coefficient assigned to a particular group is based upon correlating the associated document attribute or attributes with reliable propagations of metadata instances within the group. After the groups of metadata instances have been defined and the propagation coefficients have been assigned, propagation of a metadata instance from a second document to a first document is based upon a combination of (1) determining the particular group in which the metadata instance resides, (2) identifying the propagation coefficients that are assigned to that group for the associated document attributes, and (3) comparing the first and second documents with respect to the associated document attributes.

16 Claims, 5 Drawing Sheets

| Group | Document Type | Instances | Attribute | Propagation Coefficient |
|---|---|---|---|---|
| Personal Name | Image File | Robert | | |
| | | James | | |
| | | Karen | | |
| | | Judy | | |
| | ... | ... | ... | ... |
| | | | Time Stamp-Same Hour | 0.1 |
| | | | GPS-Same Location | 0.1 |
| | | | File Size-Same | 0.06 |
| | | | Aspect Ratio Same | 0.00 |
| | ... | | ... | ... |

AUTOMATED PROPAGATION OF DOCUMENT METADATA

TECHNICAL FIELD

The invention relates generally to techniques and systems for conditionally propagating metadata.

BACKGROUND ART

With the proliferation of imaging technology in consumer applications (e.g., digital cameras and Internet-based support), it is becoming more common to store libraries of digitized pictures and other multimedia documents, such as video files. There are a number of known approaches to identifying or organizing multimedia documents. One approach is to merely organize the documents in a chronological order based upon the times at which the documents were acquired. For example, digitized pictures may be stored in an archive that is presented to a viewer of the archive in a chronological order from the earliest acquired digital photo to the latest acquired digital photo. Another approach is to form separately labeled folders into which the multimedia documents may be stored. Thus, a folder may be labeled "Vacation," and digital photos acquired during a particular vacation trip may be stored within the folder.

In a more complex organizational approach, the contents of documents are analyzed using enabling technology, so that the documents may be categorized on the basis of contents. This approach can be useful for businesses that utilize a large volume of multimedia documents, such as an image archive of a newspaper. Content-analysis technology may be used to classify documents with identifiers that describe the image contents. Following the classification, the identifiers can be input as a query during a search operation.

A technique for distinguishing individual documents, such as digital images, is to annotate each document. An "annotation" is defined herein as a semantic label that is associated with a document by an entry by a human. That is, annotations are human generated. Typically, an annotation is descriptive of the content of the document. For example, a digital image may have the annotation "This image depicts a Hawaiian beach."

Annotations provide one form of "metadata," which is defined as information other than attribute information, that is attached to the document without being contents of the document. Metadata instances may be human-generated, but may also be automatically generated. Other forms of metadata include song lyrics attached to an audio file and ratings attached to a video file.

As distinguished from metadata, "attributes" are defined as information regarding features of the associated document. Attributes may be classified as being specific to (1) intrinsic non-content features, such as time stamps and image dimensions, (2) intrinsic content features, such as color histograms, illuminations and face detections, and (3) access and usage features, such as access patterns and usage characteristics for documents that are stored at a common site.

While the available approaches to organizing documents operate well for their intended purposes, there are concerns with each approach. For example, the content analysis for automatic classification requires a high level of sophistication for proper implementation. On the other hand, the human-generated annotations are less complex, but are laborious when used within a large archive of documents. The same is true for other forms of human-generated metadata attached to digital images and other non-textual documents. Optionally, only a limited number of documents may be annotated, with the contents of the remaining documents being inferred. As one example, the first image acquired during a vacation may be associated with an annotation, allowing a user to infer that images acquired in the same calendar week are also images of vacation activity or scenery. The inference is valid in such a situation, but less valid in others.

What is needed is a method and system for enabling automated organizational processing of documents without a high level of complexity.

SUMMARY OF THE INVENTION

An automated method for conditionally propagating metadata among documents includes defining groups of metadata instances and includes assigning different propagation coefficients to each group. The propagation coefficients assigned to a particular group are based upon correlating document attributes with determinations regarding propagating metadata instances. Each propagation coefficient assigned to a particular group is associated with at least one document attribute.

After the groups of metadata instances have been defined and the propagation coefficients have been assigned, first and second documents may be selected for conditionally propagating a specific metadata instance from the second document to the first document. Merely by example, the metadata type may be an annotation, so that the second document is annotated but the first document is annotation-free. The method and system may be used in propagating other metadata types. Propagation of the metadata from the second document to the first document is based upon a combination of (1) determining the particular group in which the metadata instance resides, (2) identifying the propagation coefficients that were assigned to that group for the associated document attributes, and (3) comparing the first and second documents with respect to those document attributes.

DETAILED DESCRIPTION

Figure 1:
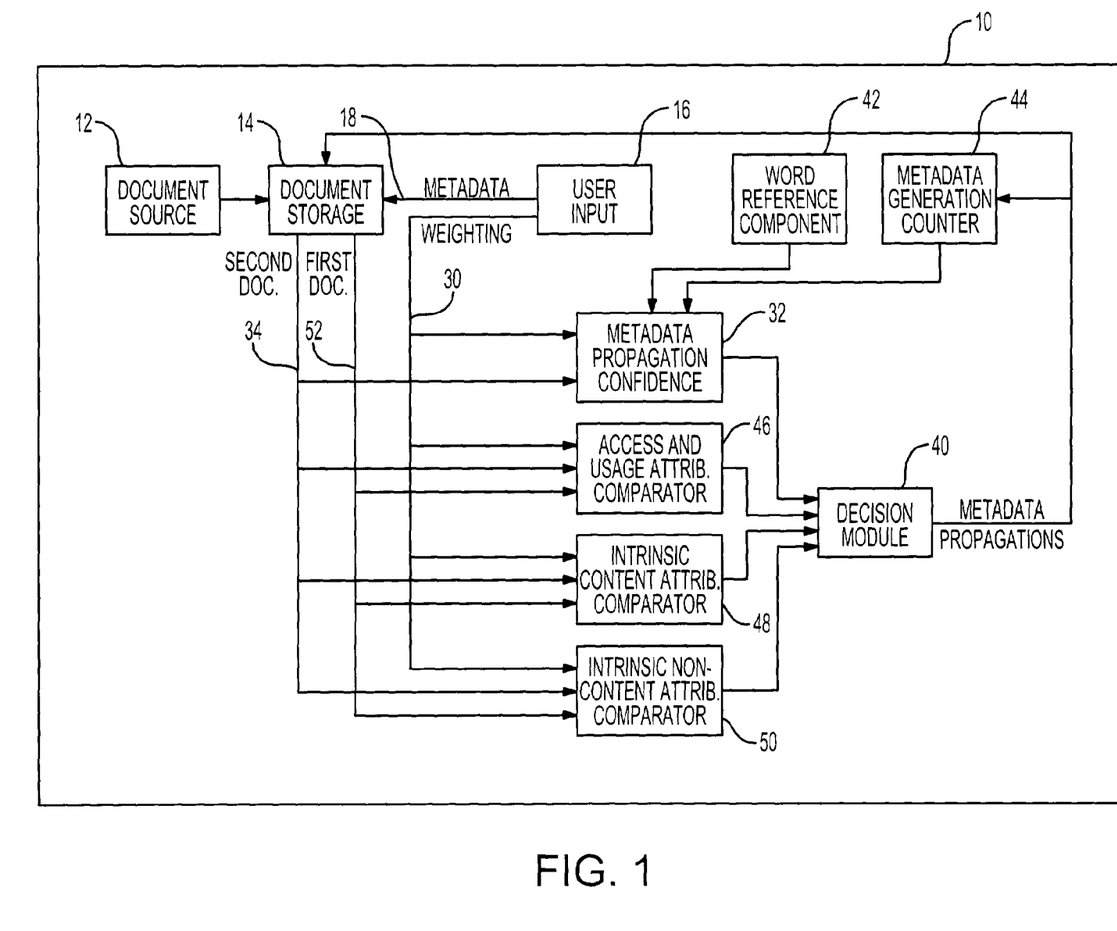
FIG. 1 is a block diagram of a system for providing conditional metadata propagation in accordance with the invention.

With reference to FIG. 1, a system 10 for conditionally propagating metadata is shown as including a document source 12 and a document storage component 14. The system is used to propagate metadata among digital files. Thus, the document storage component 14 may be used to store digital images or "multimedia documents," which are defined herein as documents having any combination of text data, image data, audio data, and video data. As one example, the system may be used with audio files for particular songs by different artists, with the conditionally propagated metadata being the names of the artists and/or the lyrics of the different songs. In another possible application, the system conditionally propagates metadata that is specifically related to the content of the file, such as a human-generated descriptive annotation that functions as a file name. In this application, an annotation attached to one document may be duplicated for simultaneous attachment to at least one other document. The system may also be used to propagate metadata, such as ratings, attached to video files.

For applications in which the documents are digital images, the source 12 may represent the optics and the sensor that are used to capture the digital images. The source 12 may be integrated with the other illustrated components of the system 10 or may be a separate device from which documents are transferred to the document storage component 14 using known wireless or wired techniques. If the document source is a separate device, it may include an independent storage capacity, such as a memory card, a hard drive, or the like.

The system 10 also includes a user input 16. The user input may be a keypad that allows an operator of the system to control processing. For example, if the system is a digital camera, the user input may be a keypad that is conventionally used to change settings or to trigger image captures. In the system of FIG. 1, the user input also allows the operator to enter annotations or other metadata, as indicated by line 18. Thus, the operator can provide file names for the digital images stored within the document storage component 14.

Figure 2:
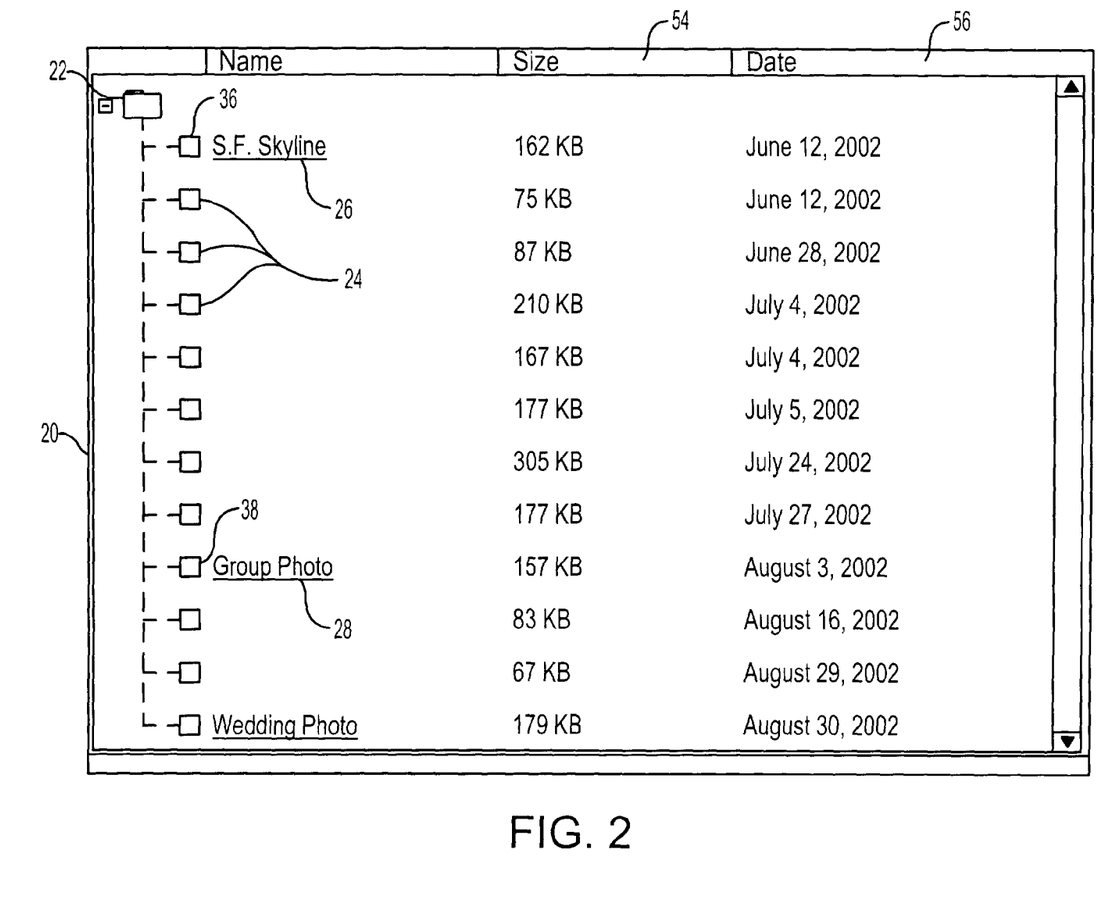
FIG. 2 is an illustration of a graphical user interface for accessing documents stored in the system of FIG. 1.

Referring briefly to FIG. 2, a display 20 shows a folder icon 22 containing image file icons 24, 36 and 38. Each image file icon represents a stored digital image. Only a small portion of the images of the display are associated with annotations 26 and 28. Generating annotations or other metadata for each file within the folder would be a time-intensive process. The propagation method that will be described is intended to reliably propagate the metadata instances from labeled files, such as those represented by icons 36 and 38, to unlabeled files, such as those represented by icons 24. The propagation is based upon identified correlations between similarities in appropriate metadata instances and similarities in at least a subset of document attributes. It has been determined that some metadata propagates more predictably than other metadata. For example, if the metadata instance of concern is a "place" annotation attached to an image file, the annotation is likely to propagate accurately from the annotated file to an annotation-free file that has precisely the same size, a similar time stamp, and a similar illumination pattern. However, similarities in the "file size" attribute and the "illumination" attribute correlate less reliably if the metadata instance of concern is a "person" annotation. Therefore, the present invention assigns propagation coefficients that are based upon the correlation between a particular document attribute and a particular metadata instance.

For the purpose of reducing the complexity of the system, metadata instances are grouped. In the embodiment to be described below, the groupings and propagation coefficients are determined during a training process using a training set of documents. Again referring to the application in which the metadata instances are annotations, "place" annotations may be grouped separately from "person" annotations. Each group is assigned a number of different propagation coefficients. The attributes are then used to map the metadata of interest. This mapping function may be termed the "channel propagation function," since each attribute functions as a channel (c). Different propagation coefficients ($\alpha(g)$) are assigned to each group (g) for different attributes, but the propagation coefficient for an attribute will change among the groups. Consequently, the propagation coefficient that is used in a propagation determination is the coefficient for a particular attribute as applied to a particular group (i.e., $\alpha(c, g)$). If more than one metadata type (e.g., annotations and file ratings) are to be considered for propagation, there are potentially different coefficients for the different metadata types.

An advantage of the invention is that by using the attributes as "channels" or "dimensions" along which metadata is able to propagate among files, a limited amount of available metadata instances may be expanded in value.

In the system 10 of FIG. 1, the user input component 16 may also be used to vary the influence that different attributes will have on the determination of metadata propagation. This ability is represented by the weighting line 30. By selectively adjusting the propagation coefficients for different groups of metadata instances, the user can define which metadata instances will be propagated more readily than others. As previously noted, similarities with regard to file sizes, times-of-creation, and illumination patterns provide a high level of confidence that a "place" annotation will propagate well from an annotated image file to an annotation-free image file. However, in the same circumstances, a "person" annotation is less likely to propagate reliably. As applied to video files, the annotation instances "school soccer," "football game," and "rugby match" can be classified into a single group "field team ball sports." In this group, the user of the system or the designer of the system may assign a high propagation coefficient to the attribute "high level activity video." To enable further customization, the user input component may also be used to change the grouping of metadata instances.

The propagation coefficients are stored in a metadata propagation confidence component 32. In addition to an input from the weighting line 30, the confidence component 32 receives an input from the document storage component 14. The input is identified as the "second document" line 34, where a "second document" represents a document to which metadata is attached, either manually by a user or automatically by a system. FIG. 2 shows an application of the invention in which the metadata type is annotations. The icons 36 and 38 represent second documents, while the icons 24 represent first documents, since they do not include annotations. The confidence component 32 is connected to the second document line in FIG. 1 in order to enable the confidence component to recognize metadata instances and supply the appropriate propagation coefficients to a decision module 40. As will be explained more fully below, the decision module 40 determines the metadata that is to be propagated to the "first documents."

In order to increase the accuracy and the versatility of the system 10, the metadata propagation confidence component 32 also has inputs from a word reference component 42 and a metadata generation counter 44. Referring to the generation counter, each time a specific metadata instance is propagated from one document to another document, the propagation can be considered to be a propagation generation with respect to the metadata instance. For each such generation, the metadata instance is a greater distance from the original source document of the metadata instance. The further that the metadata instance extends from the source document, the weaker the confidence that a subsequent propagation will be an accurate one. By being connected to the output of the decision module 40, the counter 44 is able to track the number of times that the metadata instance is propagated. For example, for applications in which the metadata instances are annotations, an annotation that is attached to a multimedia document by a human has a generation designation of i=1, while each subsequent propagation of the same annotation will increase the generation designation by the integer 1. Optionally, the propagation of a particular metadata instance will stop after the generation designation reaches a preselected value (e.g., i=5), since propagation confidence will decrease with each propagation generation.

For applications in which the metadata instances are text annotations, a dictionary, thesaurus, or the like may be used to aid in grouping the metadata instances or in identifying the group in which a specific metadata instance resides. The on-line capability referred to as "Wordnet" may be utilized, in addition to or in the place of the dictionary or thesaurus. The references are represented in FIG. 1 by the word reference component 42. A text metadata instance can be automatically classified into a group (g) and the appropriate propagation coefficients can then be determined on the basis of the grouping. Words can be classified as appearance keywords to be propagated along appearance channels, content keywords to be propagated along content channels, or time keywords to be propagated along time channels. An example is one in which a human-generated annotation of "beautiful landscape view of the Colorado Rockies" could be classified as a "global vision appearance" annotation, so that color and texture attributes could be used to propagate an annotation to other images with similar color (e.g., green and blue) and similar texture.

The attributes that are considered in determining whether metadata should be propagated from a first document to a second document will vary with applications. The attributes that will be identified herein are not intended to be all inclusive. Moreover, not all of the attributes described with reference to FIG. 1 need to be considered in all applications of the invention. Three comparators 46, 48 and 50 are shown in FIG. 1. Each comparator has three inputs. One input is the second document line 34 from which documents having attached metadata are accessed from within the document storage component 14. Another input is the first document line 52 to access documents to which metadata is to be conditionally propagated. In practice, the attributes can be accessed without removing the documents from the storage component 14. The third input to each comparator is the weighting line 30 from the user input 16, allowing an operator to determine the influences of specific attributes with respect to propagating metadata. Optionally, the weighting line is connected only to the metadata confidence component 32, which tracks the propagation coefficients of the different attributes as applied to the different groups, so as to provide the necessary information to the decision module 40.

The first comparator 46 determines the similarities among access and usage attributes of the documents. The access and usage attributes identify the access patterns and the usage characteristics of the various documents. If the first and second documents are repeatedly accessed in unison, there is a significant likelihood that the two documents are related, so that a metadata instance is related to both.

The second comparator 48 considers intrinsic content attributes. Such attributes include color histograms, illuminations, and face detections, when the invention is used with image or video files.

The third comparator 50 considers intrinsic non-content attributes, such as image dimensions, file size, and time-of-creation. Different attribute spaces will have different characteristics with regard to the propagation of metadata among documents. For example, the time-of-creation attribute tends to map linearly to semantic similarity of annotations. That is, the closer the time of creation of documents, the more likely that they are related, so that a metadata instance associated with one can be propagated reliably to the other. However, while this mapping is generally reliable, some weighted level of confidence is attached as a propagation coefficient. In comparison to the time-of-creation attribute space, the file size attribute space is less linear. The same is true of the aspect ratio attribute space. Two image or video files may be determined to be similar if they have precisely the same file size, somewhat similar if they are approximately the same file size and have the same aspect ratio, but are likely to be determined to be dissimilar if the two file sizes and the two aspect ratios are significantly different. Thus, the propagation algorithm may be such that metadata is more likely to propagate from one document to another document if the documents have approximately the same size and have the same aspect ratio.

The comparators 46, 58 and 50 provide outputs to the decision module 40. The decision module is software-driven processing that executes a propagation equation. For example, if the metadata instance (M) to be conditionally propagated is attached to a document x, where the metadata instance belongs to the group g, the propagation equation for attaching the metadata instance to a document y may be:

$$M_y^g = M_x^g \cdot \sum_c (\alpha(c, g) \cdot S_c(x, y)) \qquad \text{Eq. 1}$$

where $M_y^g$ is the weighted metadata instance M as applied to document y, $M_x^g$ is the weighted metadata instance as applied to document x, $\epsilon_c$ is the summation for all channels (i.e., attributes to be considered for the particular group g), $\alpha(c, g)$ is the propagation coefficient assigned to the group g for the particular channel c, and $S_c(x, y)$ is the similarity between the two documents x and y along the particular channel c. Variations of this propagation equation are contemplated. For example, as previously noted, the metadata generation counter 44 may be used to track the number of times that a specific metadata instance has been propagated from its original attachment to a document. Thus, if the counter is used, the generation count may be entered into the propagation equation. As one possibility, the generation count may be entered into the propagation equation as a decaying function (i) as follows:

$$M_y^g = M_x^g \cdot \sum_c (\alpha(c, g, i) \cdot S_c(x, y)) \qquad \text{Eq. 2}$$

Another possible use of the metadata generation counter 44 is to limit the number of propagation generations, since each generation results in a lower confidence level.

A concern is that weighting (i.e., confidence level) of a metadata instance $M_y^g$ may be stronger for the document to which the metadata instance is propagated than is the weighting $M_x^g$ for the source document. That is, the propagation equation may undesirably cause amplification of confidence in some circumstances. To address this concern, the propagation equation may be implemented such that the sum of the propagation coefficients for all channels within the group g is equal to 1. That is, $$\sum_c \alpha(c, g) = 1 \qquad \text{Eq. 3}$$

Figure 3:
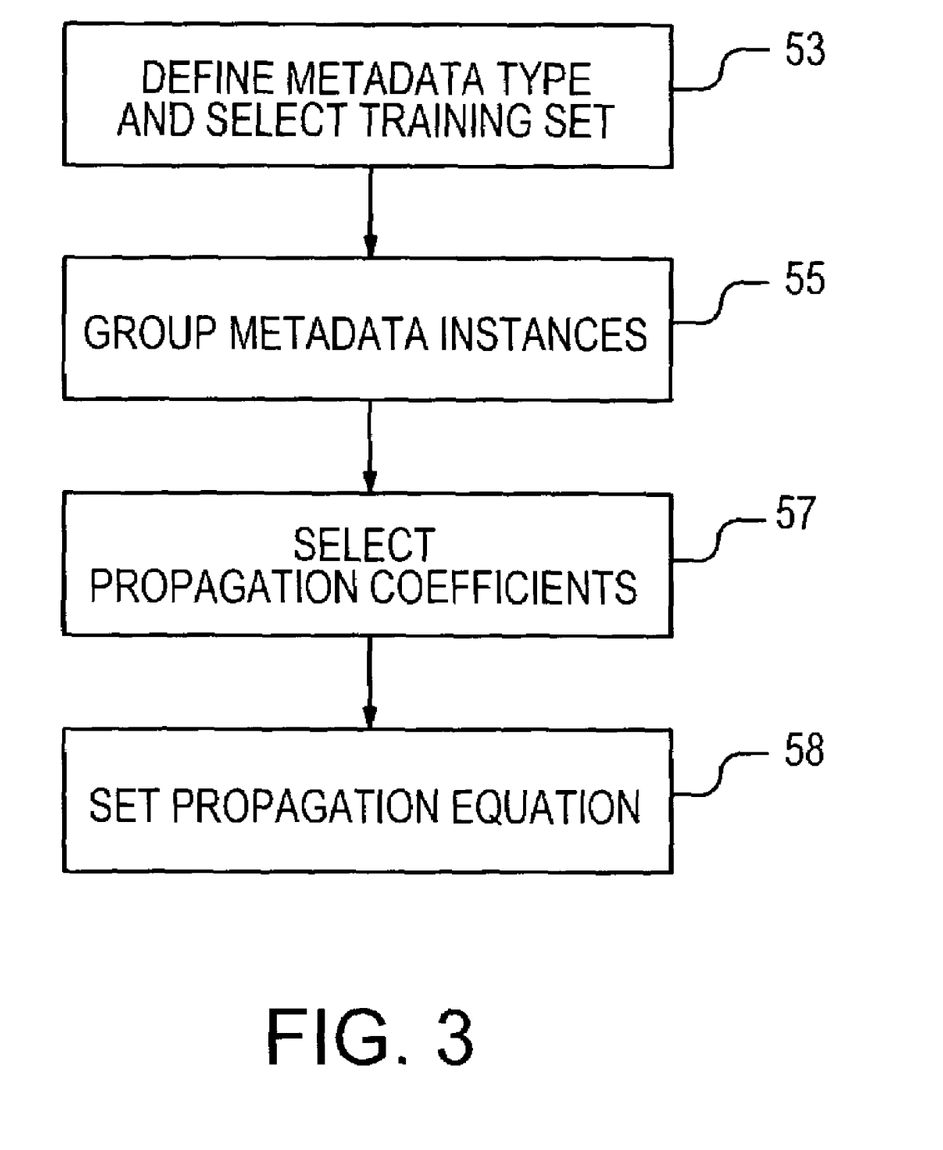
FIG. 3 is a process flow of steps for setting up the system of FIG. 1.

The process flow of set up steps for conditionally propagating metadata instances will be described with reference to FIGS. 1, 2 and 3. In step 53, the metadata type is defined and a training set of documents that include metadata instances of the defined type is selected. In one application, the metadata type is human-generated annotations. At step 55, the metadata instances of the metadata type are grouped. Merely by example, there may be a group of "person" annotations and a second group of "place" annotations.

Figure 4:
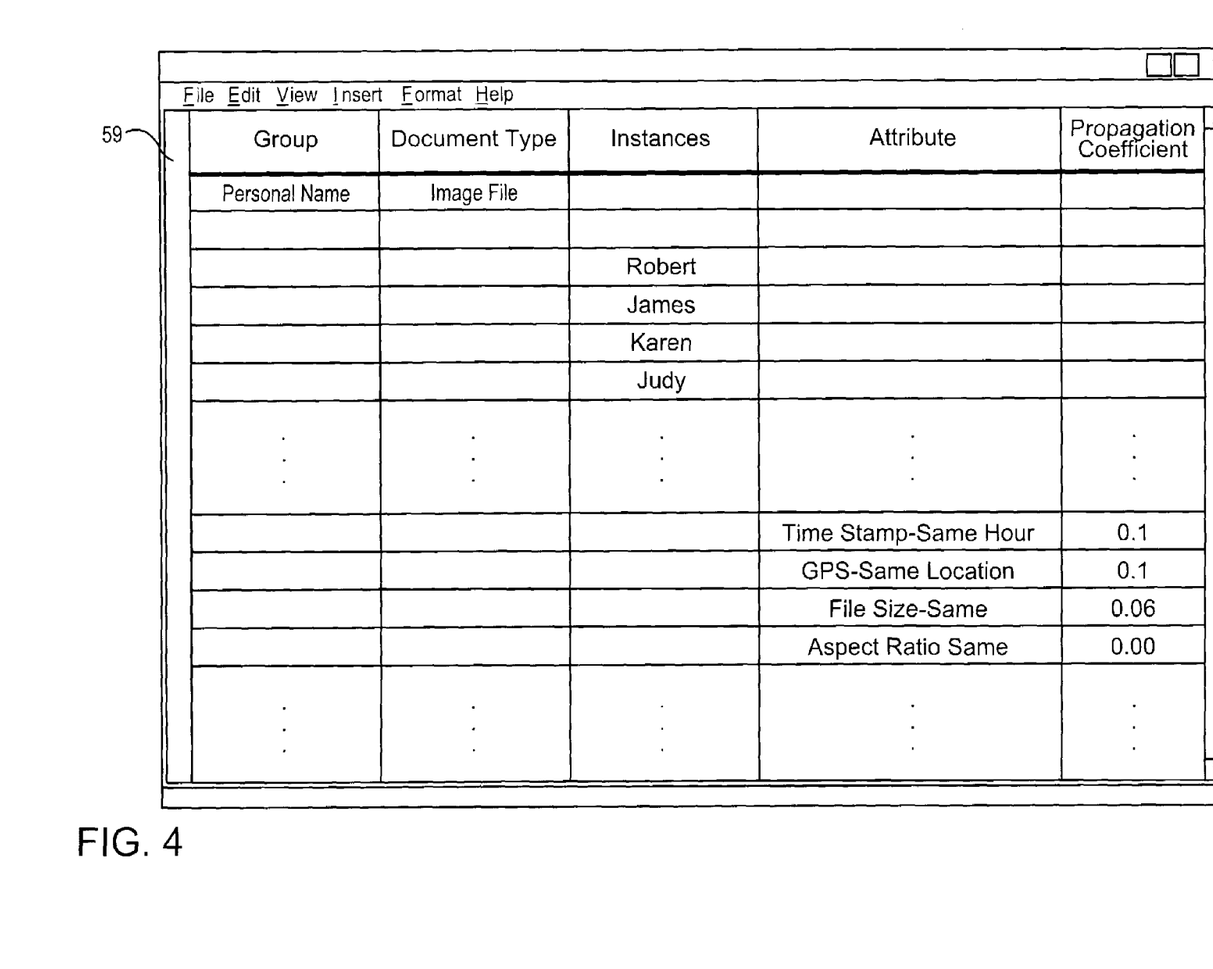
FIG. 4 is an example of a database layout for organizing information for metadata propagation in accordance with the invention.

At step 57, the propagation coefficients for each group of metadata instances are selected in a training session that uses the training set of step 53. Thus, documents having metadata instances are processed by the system in order to calculate the appropriate propagation coefficients that will be employed by the system after the set up process is completed. A single document attribute will be assigned different propagation coefficients for different groups, with the assigned propagation coefficients potentially being zero for some groups. Less than all of the available attributes (channels) may be non-zero propagation coefficients for a particular group, since some attributes may not have a relevance with regard to the particular propagation determination. On the other hand, those same attributes may be considered to be highly relevant with regard to other groups. A time-of-creation attribute correspondence between two documents is more likely to be meaningful within the domain of consumer photography than within other domains. Global Positioning System (GPS) data relevance and various other attributes are considered in the training of the system during this session. FIG. 4 is merely one example of a format for organizing the information acquired during the training session. In the example, the information is shown in a database format 59 for the group "Personal Name."

In step 58, the propagation equation is defined. This may include providing a default equation, with the user enabled to change the weighting scheme via the user input component 16 of FIG. 1. Following the completion of step 58, the system 10 is ready to begin the process of determining metadata propagations.

Figure 5:
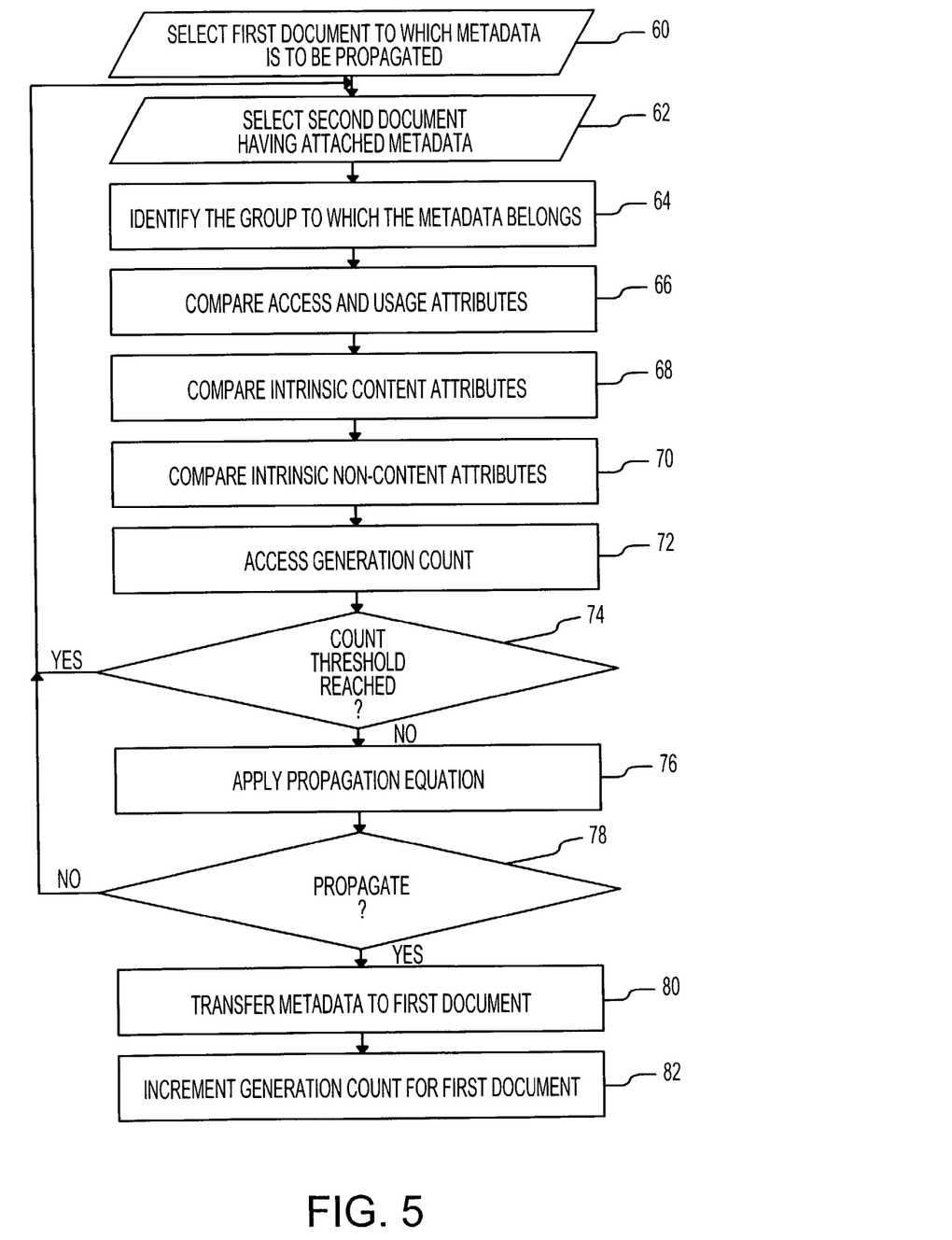
FIG. 5 is a process flow of steps for utilizing the system of FIG. 1.

Referring now to FIG. 5, a first document to which metadata is to be propagated is selected at step 60. That is, a document without a metadata instance of the type defined at step 53 of FIG. 3 is identified. Then, at step 62, a second document having a metadata instance is selected.

The specific group of the attached metadata instance of the second document is identified at step 64. The corresponding attributes of the two documents are compared at steps 66, 68 and 70. In addition to the access and usage attributes, the intrinsic content attributes, and the intrinsic non-content attributes, other document attributes may be considered. Moreover, less than all of the three sets of attributes may be considered in a propagation determination.

In step 72, the generation count is accessed to determine the number of times that the metadata instance of the second document was propagated before reaching the second document. In the decision 74, the determination is made as to whether the generation count has reached its maximum threshold number. If affirmative, the process loops back to step 62 to select a different second document. On the other hand, if the threshold has not been reached, the propagation equation is applied at step 76.

In the decision 78, the results of the propagation equation are used to determine whether the metadata instance of the second document should be also attached to the first document. A threshold level of "confidence" may be required before the metadata instance is propagated. If the determination is made to not propagate the metadata instance, the process returns to step 62 of selecting a second document having an attached metadata instance which potentially is propagated to the selected first document. On the other hand, if an affirmative response is determined at step 78 for propagating the metadata instance of the second document, the metadata instance is co-assigned to the first document at step 80. Simultaneously, the generation count is incremented for the metadata instances as applied to the first document, as indicated at step 82.

An advantage of the invention is that document attributes may be used to provide automated metadata instance propagation without requiring a complex content-based analysis of documents. Instead, more readily available information is compared to predict the appropriateness of propagating metadata instances among documents. The automated propagation capability may be incorporated within a commercially available system or may be added to a system at any time subsequent to purchase. For example, the automated processing software may be stored for downloading via a Website or may be available for installation from a compact disk. Other distribution channels are contemplated. Moreover, each user may customize the automated processing software by adding one or more document attribute computation modules, by increasing the types of metadata that may be propagated using the processing, and/or by varying the metadata groupings, either using the basic program or using add-on modules.

What is claimed is:

1. A computer-implemented method of conditionally propagating metadata among documents comprising:
    defining a plurality of groups of metadata instances;
    assigning a plurality of propagation coefficients to each said group, where each said propagation coefficient assigned to each said group is associated with at least one document attribute and is based upon correlating said associated document attribute with determinations of document-to-document propagations of said metadata instances of said group;
    selecting first and second documents between which a specific metadata instance may be propagated, said first and second documents being stored in memory;
    basing metadata propagation from said second document to said first document upon a plurality of said document attributes, including
        (a) determining a particular said group in which said specific metadata instance resides;
        (b) for each of said document attributes upon which said metadata propagation is based, identifying said associated propagation coefficient that was assigned to said particular group; and
        (c) for each of said document attributes upon which said metadata propagation is based; comparing said first and second documents with respect to said document attributes; and
    on a basis of said document attributes, selectively propagating said specific metadata instance to said first document for storage in said memory.

2. The computer-implemented method of claim 1 wherein basing said metadata propagation to said first document upon said plurality of document attributes includes calculating a metadata weighting that is determined collectively by said associated propagation coefficients that are assigned to said particular group and by degrees of similarity in comparing said first and second documents with respect to said document attributes.

3. The computer-implemented method of claim 2 wherein calculating said metadata weighting is further determined by a source weighting assigned to said specific metadata instance as applied to said second document, said source weighting being representative of a confidence that said specific metadata instance is accurately applied to said second document.

4. The computer-implemented method of claim 3 further comprising associating said metadata weighting with said first document when said specific metadata instance is propagated to said first document, said metadata weighting being representative of a confidence that said specific metadata instance is accurately applied to said first document.

5. The computer-implemented method of claim 4 wherein calculating said metadata weighting includes limiting said calculation such that said metadata weighting does not exceed said source weighting.

6. The computer-implemented method of claim 3 further comprising calculating said source weighting to be responsive to a number of propagation occurrences that said specific metadata instance experienced in being applied to said second document, said source weighting being reduced at each said propagation occurrence so as to be representative of a lowered confidence.

7. The computer-implemented method of claim 2 wherein calculating said metadata weighting is based on steps (a), (b), and (c) and includes a summing of the various produce of said propagation coefficients times the similarity levels that said first and second documents have with respect to said document attributes with which said propagation coefficients are associated.

8. The computer-implemented method of claim 1 wherein said selecting said first and second documents is from a common storage of documents and wherein said metadata propagation relates to a human-generated metadata instance attached to said second document.

9. The computer-implemented method of claim 8 wherein said step of defining said groups includes identifying groups of related annotations attached to said documents, said groups including a first group that relates to personal names and a second group that relates to geographical locations.

10. The computer-implemented method of claim 1 wherein basing said metadata propagation upon said plurality of document attributes includes referencing:
(a) document access and usage attributes that identify access patterns of said first and second documents;
(b) intrinsic non-content attributes that identify aspects of said first and second documents without directly determining content of said first and second documents; and
(c) intrinsic content-specific attributes that relate directly to said content of said first and second documents.

11. The computer-implemented method of claim 10 further comprising enabling a user to customize the relative weights assigned to different said attributes with regard to executing said metadata propagation.

12. A computer-implemented method for propagating metadata instances of a particular metadata type comprising:
grouping said metadata instances in accordance with similarities among corresponding document attributes of training documents with which said metadata instances are associated;

for each grouping of metadata instances, assigning correlation coefficients to relevant said document attributes, where said correlation coefficients are computed based on correlations between said grouping of metadata instances and individual said relevant document attributes; and propagating specific metadata instances to various second documents based on said groupings and on said correlation coefficients, said propagating being further based upon:
(a) source weightings of said specific metadata instances as applied to source documents from which said specific metadata instances are to be propagated, said source weightings being representative of a perceived confidence in attachments of said specific metadata instances to said source documents; and
(b) calculating a metadata weighting when a particular metadata instance is propagated from a source document to a particular said second document, said metadata weighting representing factors that include similarities between said source document and said particular second document, wherein calculating said metadata weighting ($m_y^g$) when said particular metadata instance is propagated from said source document (x) to said particular said second document (y) includes factoring:
(1) said source weighting ($m_x^g$) of the source document from which said particular metadata instance is propagated:
(2) said correlation coefficients for said grouping (g) in which said particular metadata instance resides, said correlation coefficients being propagation coefficients ($\alpha(c, g)$) for said relevant document attributes (c) selected for said grouping; and
(3) similarities ($S_c(x, y)$) between said source and said particular said second document with respect to said relevant document attributes selected for said grouping.

13. The computer-implemented method of claim 12 wherein said calculating is implemented using the propagation equation:

$$M_y^g = M_x^g \cdot \sum_c (\alpha(c, g) \cdot S_c(x, y)).$$

14. The computer-implemented method of claim 12 wherein said calculating further includes providing a reduction on a basis of a number of times said particular metadata instance has been propagated from an original source document.

15. The computer-implemented method of claim 12 wherein said grouping includes using said training documents as a set of documents for defining metadata groups and determining said propagation coefficients.

16. The computer-implemented method of claim 15 wherein using said training documents includes forming a propagation database that identifies (1) said metadata groups, (2) said metadata instances in each said metadata group, and (3) each said propagation coefficient assigned to said metadata instances.

* * * * *

UNITED STATES PATENT AND TRADEMARK OFFICE
CERTIFICATE OF CORRECTION

| | | |
|---|---|---|
| PATENT NO. | : 7,107,520 B2 | Page 1 of 1 |
| APPLICATION NO. | : 10/298919 | |
| DATED | : September 12, 2006 | |
| INVENTOR(S) | : Ullas Gargi | |

It is certified that error appears in the above-identified patent and that said Letters Patent is hereby corrected as shown below:

In column 8, line 60, in Claim 1, delete "based;" and insert -- based, --, therefor.

In column 9, line 33, in Claim 7, delete "produce" and insert -- products --, therefor.

In column 10, line 31, in Claim 12, delete "propagated:" and insert -- propagated; --, therefor.

Signed and Sealed this

Twenty-second Day of December, 2009

David J. Kappos
*Director of the United States Patent and Trademark Office*